June 11, 1968 J. G. PECIS 3,387,631
PUSH-PULL VALVE
Filed Nov. 5, 1965 6 Sheets-Sheet 1

Inventor
John G. Pecis

By Holcombe, Wetherill & Brisebois
Attorneys

June 11, 1968 J. G. PECIS 3,387,631
PUSH-PULL VALVE
Filed Nov. 5, 1965 6 Sheets-Sheet 2

Inventor
John G. Pecis

By
Holcombe, Wetherill & Brisebois
Attorneys

June 11, 1968 J. G. PECIS 3,387,631
PUSH-PULL VALVE
Filed Nov. 5, 1965 6 Sheets-Sheet 3

Inventor
John G. Pecis

By Holcombe, Wetherill & Brisebois
Attorneys

June 11, 1968     J. G. PECIS     3,387,631
PUSH-PULL VALVE Filed Nov. 5, 1965     6 Sheets-Sheet 5

Inventor
John G. Pecis

By Holcombe, Wetherill & Brisebois
Attorneys

United States Patent Office 3,387,631
Patented June 11, 1968

3,387,631
PUSH-PULL VALVE
John G. Pecis, Wilmington, Del., assignor to
Speakman Company
Continuation-in-part of application Ser. No. 433,161,
Jan. 27, 1965. This application Nov. 5, 1965, Ser.
No. 506,503
6 Claims. (Cl. 137—625.17)

This application is a continuation-in-part of prior application Ser. No. 433,161, filed Jan. 27, 1965, now abandoned, which was in turn a continuation-in-part of prior application Ser. No. 353,702, filed Mar. 23, 1964, also now abandoned.

This invention relates to a push-pull valve, and more in particular to a valve for controlling the flow of water through a faucet.

The term "push-pull" is used in the plumbing industry to designate a valve that is manually operated and where the valve is rotated to control the temperature of the water and forced upwardly, or pulled, to control the volume.

Heretofore, valves of various types have used the O-ring as a sealing means. For instance, the Lombardi Patent No. 3,080,146, discloses a cock for controlling the liquid flow. This cock has an O-ring in the form of a double U that is forced more than half the distance around the valve stem and is retained in position by means of a boss on the valve stem, to form a sealing means between the stem and the wall surrounding the stem. This device is known in the trade as an angle valve and belongs to the same general class as does the Mueller device, shown in Patent No. 2,631,002, where a diagonal O-ring seal is used to prevent leakage from the inlet to the outlet. None of these angle valves seal the inlet from the outlet by means of an O-ring surrounding the inlet. The only problem presented in an angle valve is leakage to the outlet. Valves of this type have one source of fluid under pressure and therefore it is unnecessary to seal this source against cross bleeding.

In valves of the type shown in the present application two fluids under pressure are admitted by means of the valve and mixed before being discharged from the valve. In valves of this type cross leakage between the two sources of fluid under pressure is a problem that has been the subject of many inventions.

A number of patents have been granted to F. H. Parker which disclose a push-pull valve of the type claimed in the present application. This valve uses O-ring sealing means circumferentially surrounding the inlet ports of each fluid under pressure and these sealing means prevent leakage but do not prevent cross bleeding between the two sources of fluid under pressure when the valve is in the off position.

In the present application the problem of cross bleeding as well as leakage has been solved by the use of O-rings.

It is an object of the present invention to provide a push-pull valve having the inlet ports sealed by means of circumferential O-rings.

It is a further object of this invention to provide a diagonal O-ring around the cylindrical shell to prevent cross bleeding between the shell and the wall of the valve housing.

It is still a further object of this invention to provide a push-pull valve having a balancing means therein to prevent creeping of the valve when in a partially open position.

It is a still further object of this invention to provide a sleeve between the O-ring and the inner valve member to prevent chaffing of the O-ring.

It is a still further object of this invention to provide a push-pull valve having balancing means therein and having a positive shut-off valve means near the outlet port.

A still further object of this invention is to provide a push-pull valve having balancing means therein and a positive shutoff valve near the outlet port and to provide such positive shut-off valve with bleed means to relieve the pressure within the valve chamber on the opening of said positive shut-off valve means.

It is another object of this invention to provide a push-pull valve suitable for use in the combination bath tub shower installation.

With the foregoing and other objects in view the invention resides in the combination of parts and in the details of construction set forth in the following specification and appended claims, certain embodiments of which are set forth in the accompanying drawings, in which:

Figures 1, 2, 8:
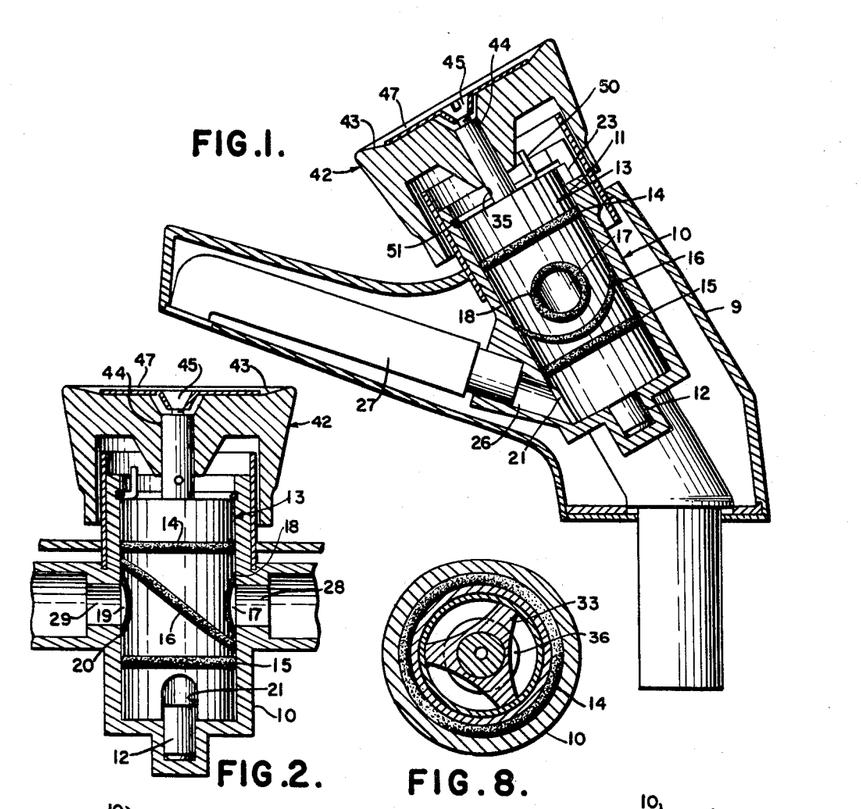
FIGURE 1 is a side view partially in section of the push-pull valve showing the valve in the closed position.
FIG. 2 is a rear view of the valve showing the valve in a closed position.
FIG. 8 is a sectional view on line 8—8 of FIG. 4.

Referring more in detail to the drawings:

In FIGURE 1 a valve housing 10 is shown formed with an upwardly opened bore of stepped diameter, thus providing at its upper end, a port of greatest diameter, 11, into which opens a lower reduced diameter portion 12. Fitting in the upper portion 11 in the bore, in the valve housing 10, is a ring retaining shell 13 having mounted on the exterior surface thereof an upper O-ring 14 and a lower O-ring 15 with a diagonal O-ring spaced from the O-rings 14 and 15. An inlet port 17 on one side of the O-ring retaining shell has an O-ring 18 mounted in the edge of this shell. This O-ring is mounted in floating engagement with the edge of the shell and has a clearance between the inner wall of the upper bore in the housing 10 and the sealing ring 32 placed therein. A similar inlet port 19 is symmetrically spaced on the opposite side of the shell, shown in FIG. 2, which has a circumferential O-ring sealing means 20 mounted in the edge of the shell. The diagonal O-ring 16 passes around the shell 13 below the inlet port 17 and above the inlet port 19. The O-ring 16 is entirely retained between the O-rings 14 and 15. The O-ring retaining shell has an outlet slot 21 at the lower end thereof below the O-ring 15. The shell 13 has a stem opening 22, shown in FIG. 3, in the upper wall thereof and on the upper circumferential surface of said shell is a lug 23 which acts as a stop to position the shell in the upper bore in the housing 10. The shell 13 is held in position by means of the snap ring 50 which overlaps the shell and is retained by a groove 51 in the valve housing 10. The stem opening 22 in the upper wall of the O-ring retaining shell has a circumferential groove 24 retaining an O-ring 25 therein, shown in FIGS. 3 and 4.

The housing 10, has an inner bore with a lower reduced diameter portion 12, in the lower end thereof, and has an outlet port 26 therein, which is connected to the nozzle 27 to form the discharge conduit for the mixed water.

The valve housing 10 has a hot water inlet port 28 and a cold water inlet port 29 symmetrically spaced in the sides of said housing. These inlet ports 28 and 29 register with the ports 17 and 19 and have the O-rings 18 and 20 therebetween. The O-rings 14 and 15 prevent water from escaping from the openings, either upwardly to the top of the valve or downwardly to the outlet port 26. The diagonal O-ring 16 prevents cross-bleeding between the hot water inlet port 28 and the cold water inlet port 29. In the reduced bore portion 12 of the valve housing 10 is located a stud 30, which is force fitted into the opening to retain the same in rigid relationship to said housing.

Figures 3, 4, 9, 10, 11:
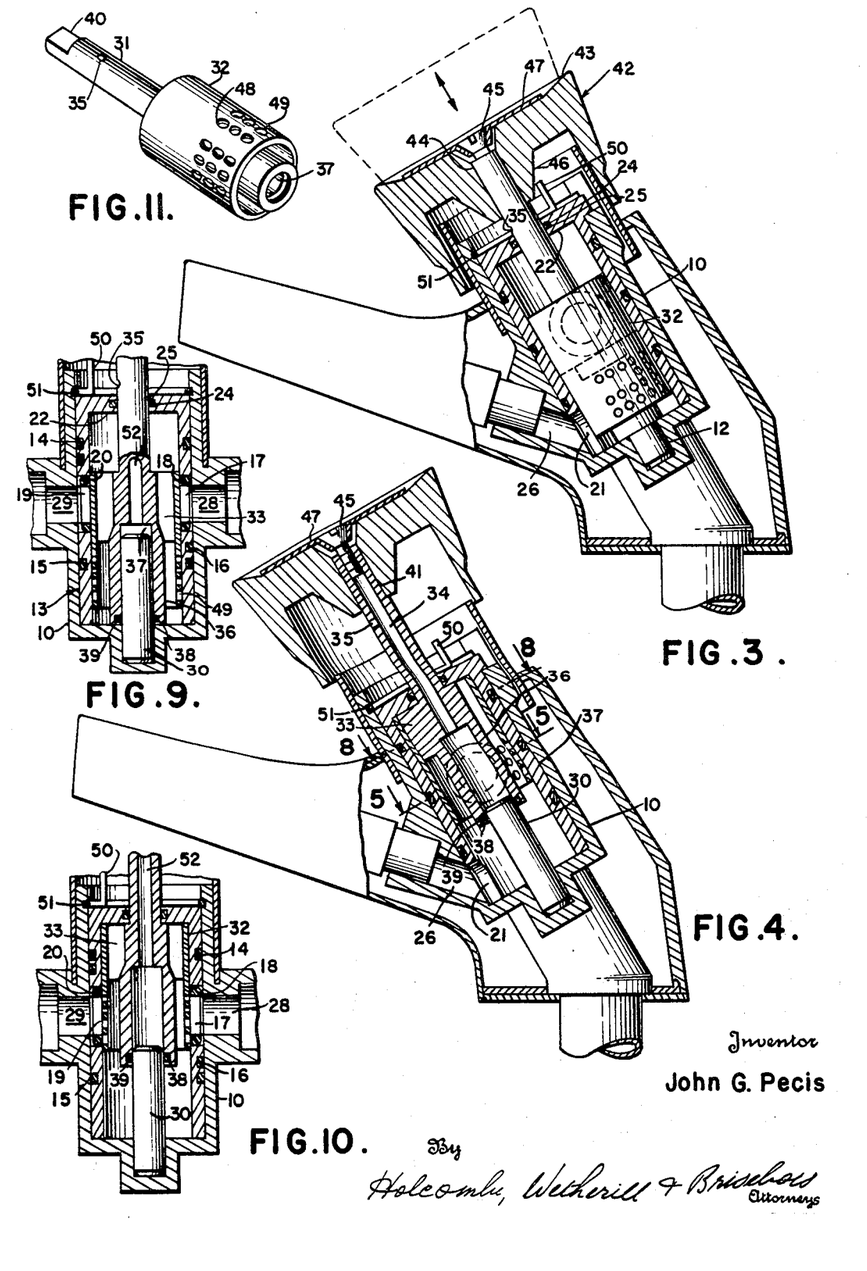
FIG. 3 is a view similar to FIG. 1 showing the cylindrical shell in section with the valve in the closed position.
FIG. 4 is a view similar to FIG. 3 showing the valve in the open position.
FIG. 9 is a vertical sectional view of the valve in closed position.
FIG. 10 is a vertical sectional view of the valve in open position.
FIG. 11 is a detailed perspective view of the sealing ring and valve stem assembly.

A valve stem 31, shown in FIG. 11, has mounted thereon a sealing ring 32 by means of a spider 33, shown in FIG. 8 to retain the sealing ring in rigid spaced relation with the valve stem 31. The upper portion of this valve stem is of the same exterior diameter as the stud 30 mounted in the bottom of the valve housing. The valve stem has a central bore 52 having a vent 35 in the side thereof. The valve stem has an enlarged portion 36 on the lower end thereof and has an enlarged central bore 37 therein. This bore is provided with an interior circumferential groove 38 adjacent the lower end thereof which groove receives and holds the O-ring 39, shown in FIGS. 4 and 10. The O-ring 39 maintains the lower enlarged portion of the valve stem 31 in water-tight engagement with the stud 30. As noted above the diameter of the stem 31 and the lower bore in the enlarged lower portion of the stem receives the stud 30 and is maintained in water-tight engagement therewith by means of the O-ring 39. This allows the valve stem 31 to ride in a balanced pressure condition on the stud 30 because of the balanced area across the upper and lower part of the sealing ring assembly on the valve stem 31 and thereby avoids creeping when the valve is partially open. The upper portion of the valve stem 31 has a flattened face 40 and it is provided in the upper end thereof with screw threads to receive and retain a fastening member to be later described.

The handle portion 42 comprises a circular knob 43 having a central bore 44 therein. The knob 42 is attached to the valve stem 31 by means of machine bolt 45 and retains the valve stem within the sleeve 46 mounted on the lower surfaces of the handle 42. This sleeve 46 has a flattened side thereof to receive and hold the flattened portion 40 on the upper end of the valve stem 31 to force the valve stem 31 to rotate with the handle 42. A circular portion 47 is retained in forced engagement with the upper surface of the handle 42 in the top of the knob 43 by the machine bolt 45.

Figure 13:
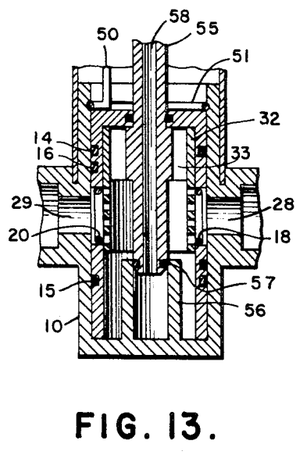
FIG. 13 is a sectional view similar to FIG. 10 showing the valve in an open position and incorporates the first modification of the balancing means.
Figure 14:
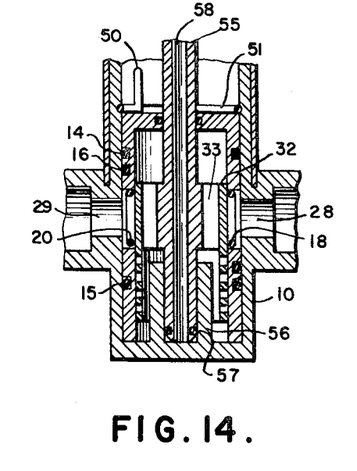
FIG. 14 is a view similar to FIG. 13 showing the valve in a closed position.

The first modification of the balancing means described above is shown in FIGS. 13 and 14, wherein the valve stem 66 has the same diameter on the upper and lower portion thereof, the lower portion is received by the boss 56 in the bottom of the housing 10 and is held in watertight engagement with the lower portion of the stem 55 by means of the sealing means 57. Attached to the valve stem 55 is the sealing ring 32, described above. The valve stem 55 is vented by means of the central bore 58.

Figure 15:
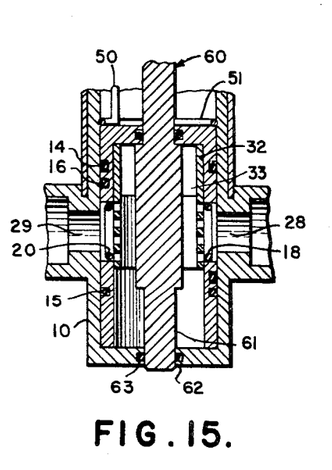
FIG. 15 is a view similar to FIG. 13 showing the valve in an open position and incorporating the second modification of the balancing means.
Figure 16:
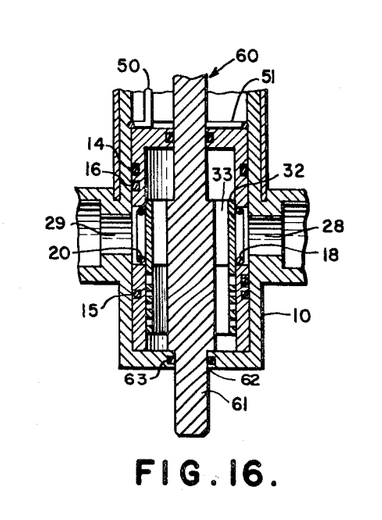
FIG. 16 is a view similar to FIG. 15 showing the valve in a closed position.

In the second modification, shown in FIGS. 15 and 16, the valve stem 60 has a lower portion 61 of the same diameter as the upper portion. This lower portion protrudes through an opening 62 in the valve housing 10 and is held in water-tight engagement therewith by the sealing means 63. When the valve is in the closed position, shown in FIG. 16, the lower portion 61 of the valve stem 60 protrudes through the housing 10, as shown.

In both of these modifications the total area within the valve casing subjected to water pressure is balanced and there is no tendency on the part of the valve stem to creep from a set position due to the pressure of the water within the valve.

Figure 17:
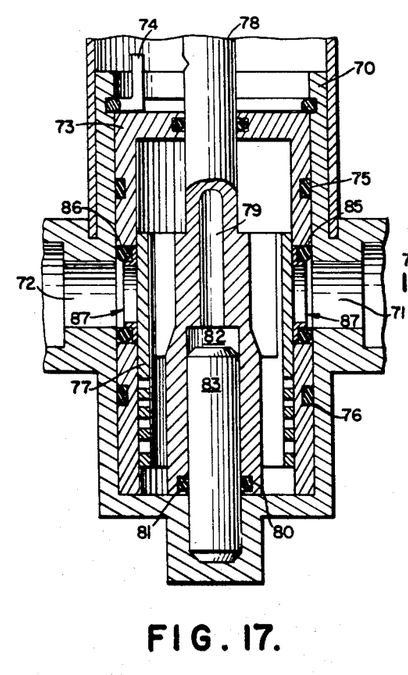
FIG. 17 is a sectional view similar to FIG. 9 with the valve in the closed position showing the first modification of the sealing means.
Figure 18:
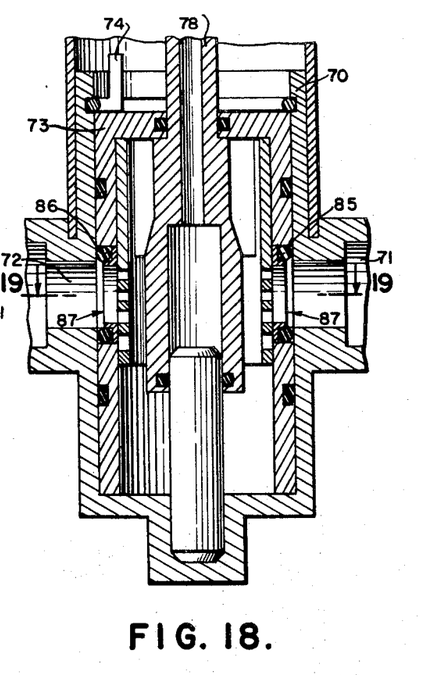
FIG. 18 is a view similar to FIG. 17 showing the valve in the open position.
Figure 19:
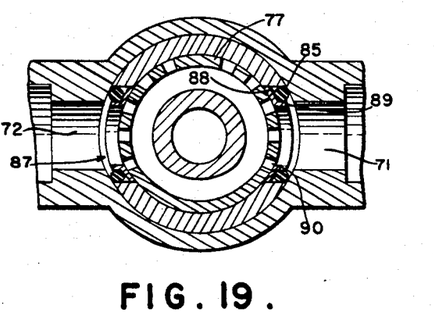
FIG. 19 is a sectional view on line 19—19 of FIG. 18.
Figure 20:
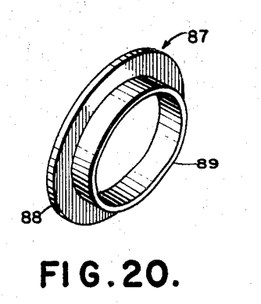
FIG. 20 is a plan view of the inlet seal sleeve.

The modification of the inlet port sealing ring means is shown in FIG. 17 wherein the valve body 70 has the hot water inlet port 71 and the cold water inlet port 72 symmetrically spaced in the side walls thereof. The ring retaining shell 73 fits within the body portion 70 and is held in position by the snap ring 74. The ring retaining shell 73 has an upper O-ring sealing means 75 above the inlet port and a lower O-ring sealing means 76 below the inlet port mounted in O-ring retaining recesses within the ring retaining shell. Within the ring retaining shell is a sealing ring 77 mounted on the valve stem 78 which valve stem has a vent opening 79 therein. This valve stem has an enlarged lower portion 80 having a sealing ring 81 mounted in a recess near the lower end thereof and has a stud receiving bore 82 therein. The valve body 70 has a stud 83 mounted in the lower central portion thereof which stud 83 is received in the portion 82 of the valve stem and held in water-tight engagement therewith by means of the O-ring 81, and operates in the same manner as the device shown in FIG. 9 to produce a balanced pressure condition within the valve and prevent creeping of the valve sealing ring when in a partially open position. Adjacent each inlet port 71 and 72 is an O-ring sealing means 85 and 86. These O-rings are in firm contact with the valve body and the opening in the sealing ring retaining shell 73. The inlet sealing sleeve 87 shown in FIG. 20 comprises a flattened portion 88 and a skirt portion 89 at right angles thereto. This inlet sealing sleeve is retained between the sealing ring 77, as shown in FIG. 19, so that the portion 88 is in contact with the movable sealing ring 77 and the skirt portion 89 retains the sealing ring 85 in position within the valve. This inlet sealing sleeve is preferably made of a friction resistant material such as Teflon but may be made of any material that will allow the ring 85 to assume its sealing position and protect it from abrasion by the openings 90 in the sealing ring 77.

This modification does not require the diagonal O-ring 16 shown in FIG. 2 as cross-bleeding is prevented between the inlet ports 71 and 72 by the O-rings 85 and 86.

While in the foregoing specification the sealing means is referred to as O-ring, rings of other than spherical cross section may be used.

Figure 12:
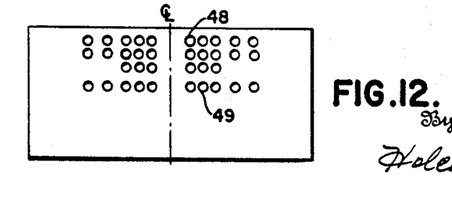
FIG. 12 is a flattened view of the sealing ring shown in FIG. 11.

As noted above the sealing ring 32 is mounted on the lower end of the valve stem 31 by means of the spider 33. This sealing ring has a vertical series of holes 48 with a vertical adjacent series 49 which holes are in series on each side of a central axis of the sealing ring as shown in FIG. 12. These holes vary in number so as to give an effective opening through the sealing ring which will, when brought into registry with the inlet ports 17 and 18, give a constant flow of water from one or both ports, depending on the position of the sealing ring. That is, the water flowing through the holes will be relatively constant even though one port is completely closed or each port is partially open, the volume of the water being regulated by the vertical position of the sealing ring 32, in the O-ring retaining shell 13.

Figure 5:
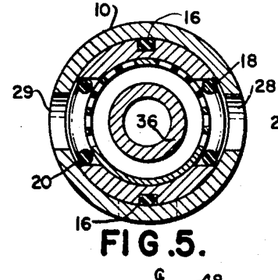
FIG. 5 is a sectional view on line 5—5 of FIG. 4, showing the valve in open position, admitting both hot and cold water.
Figure 6:
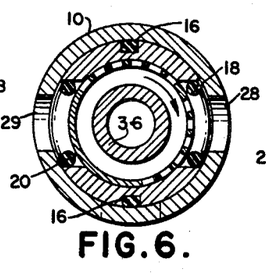
FIG. 6 is a sectional view similar to FIG. 5 showing the cold water inlet port closed and the hot water inlet port open.
Figure 7:
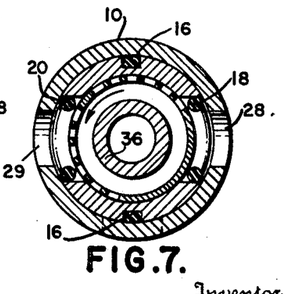
FIG. 7 is a view similar to FIG. 6 with the hot water inlet port closed and the cold water inlet port open.

The temperature of the water is regulated by the rotation of the handle 42 to expose more or less of each port in conjunction with the mating port. This is shown in FIG. 5 where the holes 48 and 49 in the sealing ring 32 are in line with the cold water port 29 and the hot water port 28. The holes on both sides of the sealing ring are in line with these ports. When the ring is rotated into an intermediate position as shown in FIG. 6, where more holes are in line with the hot water port 28, and the cold water port 29 is closed by the imperforate back portion of the sealing ring 32, the volume of water remains constant. When the direction of rotation is reversed the imperforate back portion closes the hot water port 28, and opens the cold water port 29. The water delivered in all three of the positions shown in FIGS. 5, 6, and 7 is a reasonably constant amount. In order to close the valves the valve stem is forced downwardly and the upper imperforate portion of the sealing ring covers both of the inlet ports 28 and 29. Therefore, the volume of water is regulated by the vertical motion of the valve stem and the temperature of the water is regulated by the rotational motion of the valve stem. This is characteristic of the "push-pull" valves. The valve body is encased in the escutcheon 9.

Figures 21, 22, 23:
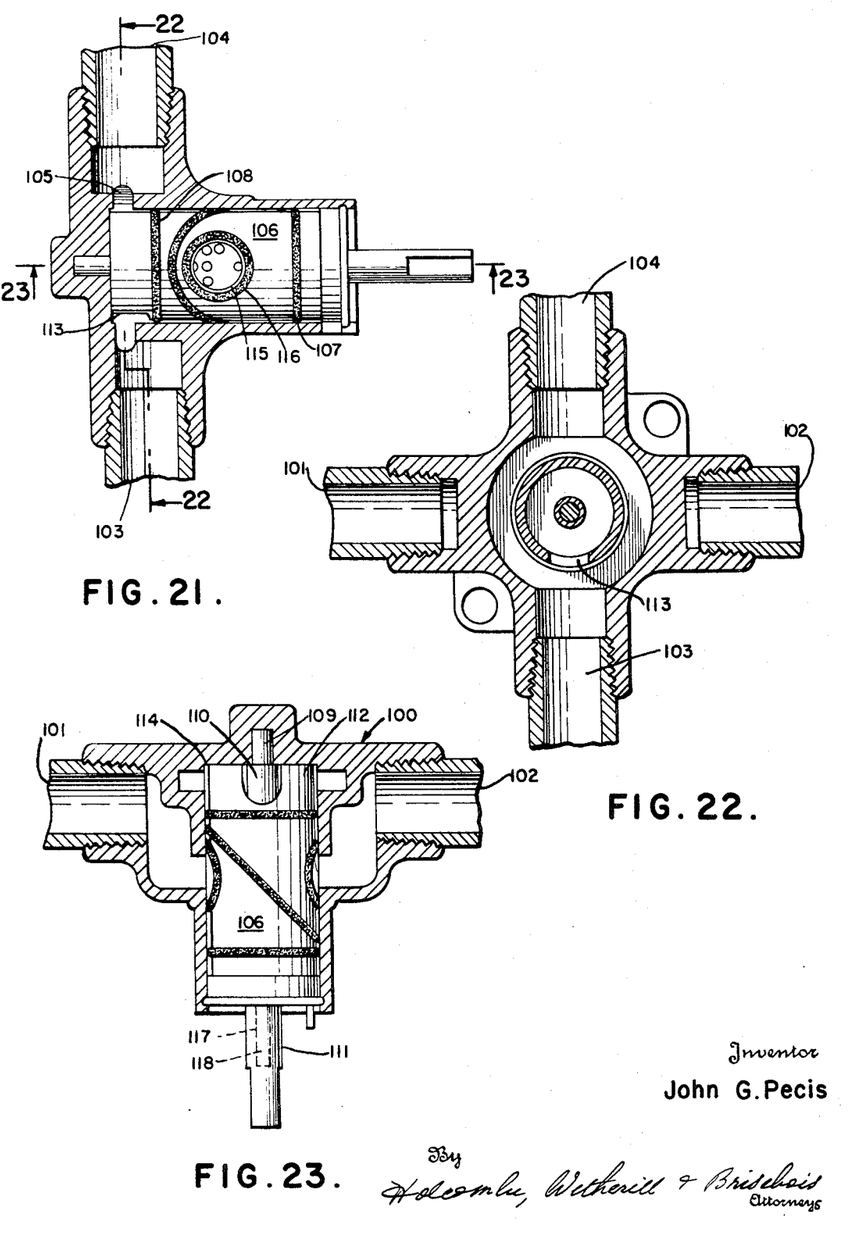
FIG. 21 shows a modification, partially in section of the push-pull valve suitable for use in a combination tub and shower installation.
FIG. 22 is a sectional view taken on line 22—22 of FIG. 21.
FIG. 23 is a sectional view taken on line 23—23 of FIG. 21.

The modification shown in FIGS. 21, 22 and 23 permits the use of the push-pull valve above described in a combination tub and shower installation. The housing 100 has the inlet port 101 for hot water and 102 for cold water. It has a lower discharge port 103 leading to the tub and an upper discharge port 104 leading to the shower. The cored-out chamber 105 connects the ports 103 and 104. The valve shell 106 is similar to the shell 13, described above and has the O-rings 107 and 108 thereon to retain it in watertight engagement with the housing 100. The stud 109 is mounted in the bottom of the housing 100 and is retained in an opening in the expanded portion as a stem 111 so as to maintain the valve unit in pressure balanced relationship. The skirt or bottom portion 112 of the valve shell 106 has an opening 113 therein. This skirt portion is seated in a recess 114 in the bottom of the housing 100. The opening 113 is adjacent to and discharges directly into the lower discharge port 103 with sufficient force to create a suction in the upper shower discharge port 104 and thereby prevents discharge of water from the shower when the tub discharge port is being used. A diverter valve (not shown) is placed in the tub discharge faucet (not shown) which effectively closes this discharge opening and forces the water through the cored-out chamber 105 outwardly through the shower discharge port 104 into the shower head (not shown). An inlet sealing sleeve 115 is similar to the sleeve shown in FIG. 20, and retains in position the O-ring 116 surrounding the inlet ports.

The operation of this push-pull valve is similar to the operation of the valve shown in FIGS. 1 and 2 and has the same operating handle on the end of the valve stem 111 to control the same. The valve stem 111 has a central bore 117 therein with a vent opening 118 through the valve stem 111. This construction is similar to the valve stem shown in FIGS. 1 to 4 which has a central bore 34 and the vent opening 35 therein.

Figures 24, 25:
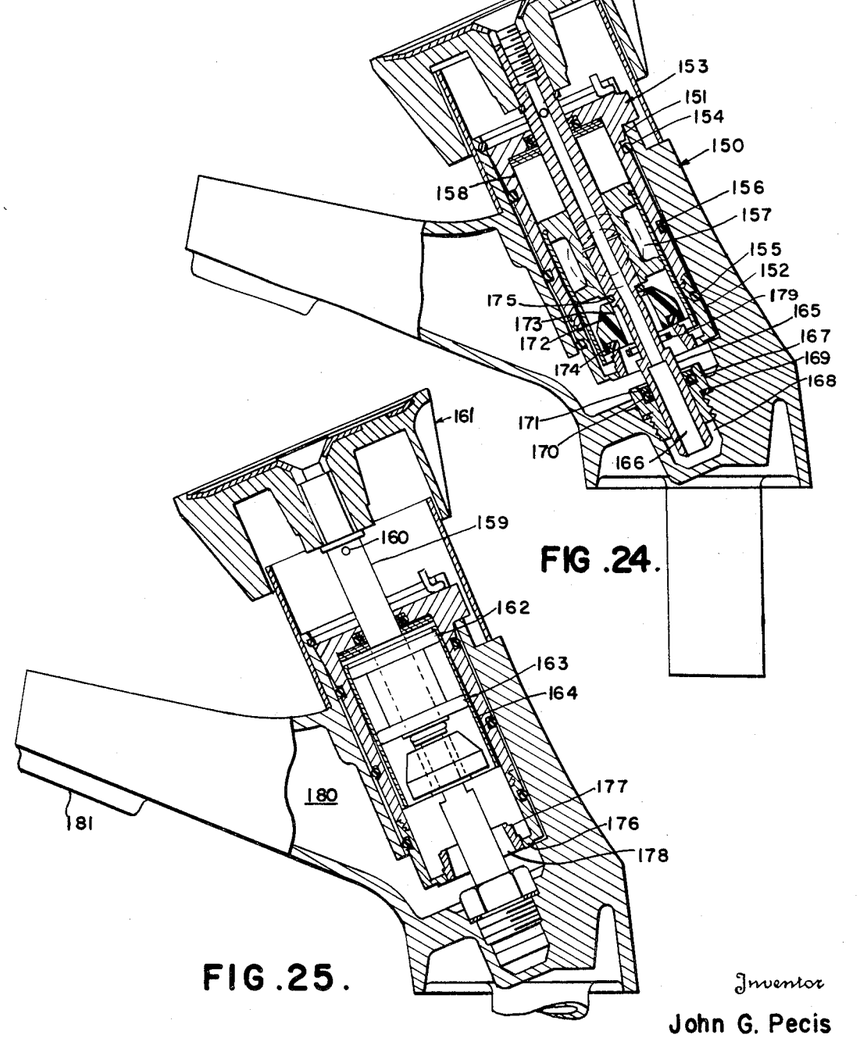
FIG. 24 shows a modification, partially in section of the push-pull valve having a positive shut-off valve means, said valve means being in the closed position.
FIG. 25 is similar to FIG. 24, showing the valve means in the open position.

The modification shown in FIGS. 24 and 25 has a housing 150 which is formed with an upwardly opening bore of stepped diameter, thus providing at its upper end a part 151 of greater diameter into which opens a lower reduced diameter portion 152. Fitting in the upper part 151 in the bore in the valve housing 150 is a ring retaining shell 153 having mounted on the exterior surface thereof an upper O-ring 154 and lower O-ring 155 and an intermediate diagonal O-ring 156 spaced from the rings 154 and 155. An inlet port 157 on one side of the O-ring retaining shell has an O-ring (not shown) mounted in the edge of this shell. This O-ring is mounted in the shell preferably with an inlet sealing sleeve similar to that shown in FIGURE 20. The shell 153 has a central bore 158 therein. Mounted within this bore is a hollow valve stem 159 having a vent 160 near the top thereof. Mounted on the top of this valve stem is a handle portion 161. Mounted on the valve stem 159, by means of the spaced spiders 162 and 163, is the sealing ring 164. All of this structure is similar to the embodiment in FIGS. 1 to 4 inclusive. Mounted on the lower end of the valve stem 159 is a bottom portion 165. This bottom portion has an air passage 166 therein and is retained in and held by a guide means 167 mounted in the upper end of a chamber 168 in the bottom portion of the housing 150. This guide means is screwed into position in the upper portion of this chamber and is held in water-tight engagement with the housing by means of the washer 169, and retains within the upper end thereof an O-ring 170, having a sealing sleeve similar to that shown in FIG. 20 therearound. This O-ring 170 and its cooperating sleeve is held in position by the metal ring 171 which is retained within the guide means 167 by having the upper end thereof deformed to retain this ring.

Mounted in floating engagement on the valve stem is a valve head 172, which allows an opening 173 between the central portion of this valve head and the valve stem, said valve head having a washer 174 in the lower surface thereof and the valve stem having an O-ring or bleed ring 175 mounted thereon. The lower end of the shell 153 has a flange 176 partially closing the lower end thereof with a boss 177 concentric with the valve stem 159 and allowing a discharge port 178 between the boss and the stem.

When the valve is in the closed position, as shown in FIG. 24, the valve stem 159 is forced downwardly as shown, and the floating valve head 172 is brought into contact on its lower surface with the upper edge of the boss 177 forming a seal therewith. The upper edge of the floating valve head 172 is brought into contact with the O-ring 175 thereby providing at the bottom of the shell 153 a positive shut-off sealing means. When the valve stem 159 is raised the water pressure within the floating valve head 172 retains it in contact with the lower valve boss 177 until such a time as the O-ring opens the water bleed passage 173 between a valve stem 159 and the valve head 172. This allows the bleeding of water from the chamber above the valve head into the discharge opening 178 and establishes a back pressure against the floating valve head which permits it to be easily raised when the projection 179, mounted on the valve stem 159, below the valve head, comes into contact with said valve head and thereby raises it, breaking the seal between the boss 177 and the lower portion of the valve head thereby opening the discharge port 178. This permits the water to flow under the control of the sealing ring 164 through the discharge passage 178 into the discharge chamber 180 and out the nozzle 181.

While in accordance with the provisions of the statute, the best forms of embodiment of this invention now known have been illustrated and described, it will be apparent to those skilled in the art that changes may be made in the forms of the apparatus disclosed, without departing from the spirit of this invention, as set forth in the appended claims; and in some cases certain features of this invention may be used to advantage without a corresponding use of other features.

What is claimed is:

1. In a mixing valve assembly, including in combination:
   (a) a cylindrical valve housing with a main elongated axial bore having a discharge outlet near the bottom thereof and two opposed water inlets, one for cold and one for hot water, above said discharge outlet, said bore having a vertical stud permanently mounted in the bottom wall thereof,
   (b) a sealing means retaining shell having an open lower end and a closed upper end, said upper end having a central opening with a sealing means therein, said shell having two opposed inlet ports to register with said water inlets in said housing, each of said water inlet ports having a sealing means therein, an inlet seal sleeve within each inlet port comprising a flattened face portion and a skirt portion raised therefrom to retain the sealing means within the inlet ports, said flattened portion contacting an inner sealing ring, a groove above said inlet ports having a sealing means on the exterior surface of said shell, a groove on the exterior surface of said shell below said inlet ports having a sealing means therein, an outlet slot below said second sealing means registering with the outlet in said housing, all of the sealing means on the exterior surface of said sealing means retaining shell contacting the inner surface of the bore of said housing, the sealing means in the ports being retained in firm contact therewith,
   (c) a sealing ring within said shell, being retained in water-tight engagement therewith, said ring having a series of openings therein on the lower portion thereof, said sealing ring being mounted on a stem by means of a spider, said stem being mounted in the central opening in the upper end of said shell, said stem having an enlarged lower portion and having the same external diameter at the upper portion of said stem as said stud mounted in the bottom of said housing, said stem having a central bore therethrough and having a vent near the top thereof, said enlarged portion of said stem having an axial bore therein to receive said stud and having a sealing means mounted in the lower portion thereof to maintain said bore in watertight engagement with said stud, said sealing ring and said stem being capable of rotation and longitudinal movement within said shell, and whereby the upper portion of said ring will seal both of said inlet ports and the lower portion having said openings therein which may be brought into engagement with either or both of said ports to admit hot water or cold water or both in a constant volume.

2. In a mixing valve assembly, including the combination:
   (a) a cylindrical valve housing with a main elongated axial bore having upper and lower discharge outlets with a water chamber therebetween near the bottom thereof, and two opposed water inlets, one for cold and one for hot water, between said discharge outlets, said bore having a vertical stud permanently mounted in the bottom wall thereof,
   (b) a sealing means retaining shell having an open lower end and a closed upper end, said upper end having a central opening with a sealing means therein, said shell having two opposed inlet ports to register with said water inlets in said housing, each of said water inlet ports having a sealing means therein, an inlet seal sleeve within each inlet port comprising a flattened face portion and a skirt portion raised therefrom to retain the sealing means within the inlet ports, a groove above said inlet ports having a sealing means on the exterior surface of said shell, a groove on the exterior surface of said shell below said inlet ports having a sealing means therein, an outlet slot below said second sealing means registering with the lower outlet in said housing, a diagonal groove below one of said inlet ports and above the other of said inlet ports having a sealing means therein, on the exterior surface of said shell, all of the sealing means on the exterior surface of said sealing means retaining shell contacting the inner surface of the bore of said housing, the sealing means in the ports being retained in floating engagement therewith,
   (c) a sealing ring within said shell, being retained in water-tight engagement therewith, said ring having a series of openings therein in the lower portion thereof, said sealing ring being mounted on a stem by means of a spider, said stem being mounted in the central opening in the upper end of said shell, said stem having an enlarged portion and having the same external diameter at the upper portion of said stem as said stud mounted in the bottom of said housing, said stem having a central bore therethrough and having a vent means near the top thereof, said enlarged portion of said stem having an axial bore therein to receive said stud and having a sealing means mounted in the lower portion thereof to maintain said bore in water tight engagement with said stud, said sealing ring and said stem being capable of rotational and longitudinal movement within said shell, and whereby the upper portion of said ring will seal both of said inlet ports and the lower portion having said openings therein which may be brought into engagement with either or both of said ports to admit hot water or cold water or both in a constant volume.

3. In a mixing valve assembly, including in combination:
   (a) a cylindrical valve housing with a main elongated axial bore having upper and lower discharge outlets with a water chamber therebetween near the bottom thereof, and two opposed water inlets, one for cold and one for hot water, between said discharge outlets, said bore having a vertical stud permanently mounted in the bottom wall thereof,
   (b) a sealing means retaining shell having an open lower end and a closed upper end, said upper end having a central opening with a sealing means therein, said shell having two opposed inlet ports to register with said water inlets in said housing, each of said water inlet ports having a sealing means therein, an inlet seal sleeve within each inlet port comprising a flattened face portion and a skirt portion raised therefrom to retain the sealing means within the inlet ports, a groove above said inlet ports having a sealing means on the exterior surface of said shell, a groove on the exterior surface of said shell below said inlet ports having a sealing means therein, an outlet slot below said second sealing means registering with the lower outlet in said housing, a diagonal groove below one of said inlet ports and above the other of said inlet ports having a sealing means therein, on the exterior surface of said shell, all of the sealing means on the exterior surface of said sealing means retaining shell contacting the inner surface of the bore of said housing, the sealing means in the ports being retained in firm contact therewith,
   (c) a sealing ring within said shell, being retained in water-tight engagement therewith, said ring having a series of openings therein in the lower portion thereof, said sealing ring being mounted on a stem by means of a spider, said stem being mounted in the central opening in the upper end of said shell, said stem having an enlarged portion and having the same external diameter at the upper portion of said stem as said stud mounted in the bottom of said housing, said stem having a central bore therethrough and having a vent means near the top thereof, said enlarged portion of said stem having an axial bore therein to receive said stud and having a sealing means mounted in the lower portion thereof to maintain said bore in water tight engagement with said stud, said sealing ring and said stem being capable of rotational and longitudinal movement within said shell, and whereby the upper portion of said ring will seal both of said inlet ports and the lower portion having said openings therein which may be brought into engagement with either or both of said ports to admit hot water or cold water or both in a constant volume.

4. In a mixing valve assembly for a cylindrical valve housing with a main elongated axial bore having a discharge outlet near the bottom thereof and two opposed water inlets, one for cold water and one for hot water above said discharge outlet, said bore having an opening in the bottom wall thereof, the assembly comprising:

(a) a sealing means retaining shell having a closed upper end, said upper end having a central opening with a sealing means therein, said shell having two opposed inlet ports to register with said water inlets in said housing, each of said water inlet ports having sealing means therein comprising an O-ring and an inlet seal sleeve, a groove above said inlet port having a sealing means on the exterior surface of said shell, a groove on the exterior surface of said shell below said inlet port having a sealing means therein, a diagonal groove below one of said ports and above the other of said inlet ports and having a sealing means therein on the exterior surface of said shell, all of the sealing means on the exterior surface of said sealing means retaining shell contacting the inner surface of the bore of said housing, the lower end of said shell having a flange thereon with an upstanding hollow boss near the center thereof defining a discharge passage therein, (b) a sealing ring within said shell being retained in water-tight engagement therewith, said ring having a series of openings therein in the lower portion thereof, said sealing ring being mounted on a hollow stem by means of a spider, said stem being mounted in the central opening in the upper end of said shell, said stem having a lower portion of the same external diameter as the upper portion of said stem to be received in and retained in water-tight engagement with the opening in the bottom wall of said housing, said sealing ring and said stem being capable of rotational and longitudinal movement within said shell, whereby the upper portion of said sealing ring will seal both of said inlet ports and the lower portion having openings therein which may be brought into engagement with either or both of said ports to admit hot water or cold water or both in a constant volume, (c) a bleed ring mounted on said valve stem and having a floating valve head below said bleed ring and above said boss, a bleed passage below said bleed ring and between said valve head and said stem opening into the discharge passage, a ring mounted on said valve stem below said valve head so that when the valve stem is raised the bleed ring will open the bleed passage before the ring raises the floating valve head from the boss opening the discharge passage to the full flow of water.

5. In a mixing valve assembly, including in combination:

(a) a cylindrical valve housing with a main elongated axial bore having a discharge outlet near the bottom thereof and two opposed water inlets, one for cold water and one for hot water, above said discharge outlet, said bore having an opening in the bottom wall thereof, (b) a sealing means retaining shell having a closed upper end, said upper end having a central opening with a sealing means therein, said shell having two opposed inlet ports to register with said water inlets in said housing, each of said water inlet ports having sealing means therein comprising an O-ring and an inlet seal sleeve within each inlet port comprising a flattened face portion and a skirt portion raised therefrom to retain the O-ring within the inlet ports, said flattened portion contacting an inner sealing ring, a groove above said inlet port having a sealing means on the exterior surface of said shell, a groove on the exterior surface of said shell below said inlet port having a sealing means therein, a diagonal groove below one of said ports and above the other of said inlet ports and having a sealing means therein on the exterior surface of said shell, all of the sealing means on the exterior surface of said sealing means retaining shell contacting the inner surface of the bore of said housing, the lower end of said shell having a flange thereon with an upstanding hollow boss near the center thereof defining a discharge passage therein, (c) a sealing ring within said shell being retained in water-tight engagement therewith, said ring having a series of openings therein in the lower portion thereof, said sealing ring being mounted on a hollow stem by means of a spider, said stem being mounted in the central opening in the upper end of said shell, said stem having a lower portion of the same external diameter as the upper portion of said stem to be received in and retained in water-tight engagement with the opening in the bottom wall of said housing, said sealing ring and said stem being capable of rotational and longitudinal movement within said shell, whereby the upper portion of said sealing ring will seal both of said inlet ports and the lower portion having openings therein which may be brought into engagement with either or both of said ports to admit hot water or cold water or both in a constant volume, (d) a floating valve head on said stem, a ring mounted on said valve stem below said valve head and bleed means to the discharge passage so that when the valve stem is raised the ring raises the floating valve head from the boss opening the discharge passage to the full flow of water.

6. In a mixing valve assembly including in combination:

(a) a cylindrical valve housing with a main elongated axial bore having a discharge outlet near the bottom thereof, and two opposed water inlets, one for cold water and one for hot water, above said discharge outlet, (b) a sealing means retaining shell having a closed upper end, said upper end having a central opening with a sealing means therein, said shell having two opposed inlet ports to register with said inlets in said housing, each of said inlet ports having a sealing means therein, comprising an O-ring and an inlet seal sleeve within each inlet port comprising a flattened face portion and a skirt portion raised therefrom to retain the O-ring within the inlet ports, said flattened portion contacting an inner sealing ring, sealing means on the exterior surface of said shell to prevent leakage of water between the shell and said housing the lower end of said shell having a flange thereon with an upstanding hollow boss near the center thereof defining a discharge passage therein, (c) a sealing ring within said shell being retained in water-tight engagement therewith, said ring having a series of openings in the lower portion thereof, said sealing ring being mounted on a stem, said stem extending through the opening in the upper end of said shell, said stem having a lower portion of the same external diameter as the upper portion of said stem, means associated with said stem to balance the static pressures exerted thereon, whereby the upper portion of said sealing ring will seal both of said inlet ports and the lower portion having openings therein which may be brought into engagement with either or both of said ports to admit hot water or cold water or both in a constant volume, (d) a bleed ring mounted on said valve stem and having a floating valve head below said bleed ring and above said boss, a bleed passage below said bleed ring and between said valve head and said stem opening into the discharge passage, a ring mounted on said valve stem below said valve head so that when the valve stem is raised the bleed ring will open the bleed passage before the ring raises the floating valve head from the boss opening the discharge passage to the full flow of water.

References Cited

UNITED STATES PATENTS

| Re. 25,920 | 11/1965 | Moen | 137—625.17 |
| 2,943,792 | 7/1960 | Moen | 137—625.17 |
| 2,987,079 | 6/1961 | Page | 137—625.17 |
| 3,185,176 | 5/1965 | Webb | 137—625.17 |

M. CARY NELSON, *Primary Examiner.*

ALAN COHAN, *Examiner.*

W. R. CLINE, *Assistant Examiner.*